(12) United States Patent
Suzuki

(10) Patent No.: US 8,709,667 B2
(45) Date of Patent: Apr. 29, 2014

(54) MAGNESIUM METAL-AIR BATTERY

(75) Inventor: Susumu Suzuki, Kawaguchi (JP)

(73) Assignee: Suwei Association, Kawaguchi-Shi, Saitama (JP)

( * ) Notice: Subject to any disclaimer, the term of this patent is extended or adjusted under 35 U.S.C. 154(b) by 0 days.

(21) Appl. No.: 13/878,027

(22) PCT Filed: Jul. 30, 2012

(86) PCT No.: PCT/JP2012/069359
§ 371 (c)(1),
(2), (4) Date: Apr. 5, 2013

(87) PCT Pub. No.: WO2013/018769
PCT Pub. Date: Feb. 7, 2013

(65) Prior Publication Data
US 2013/0209899 A1 Aug. 15, 2013

(30) Foreign Application Priority Data

Aug. 2, 2011 (JP) ................................. 2011-169177

(51) Int. Cl.
*H01M 12/06* (2006.01)
(52) U.S. Cl.
USPC ............................ 429/405; 429/402; 429/403
(58) Field of Classification Search
USPC .................. 429/118–119, 402, 403, 405, 523
See application file for complete search history.

(56) References Cited

U.S. PATENT DOCUMENTS 4,007,316 A * 2/1977 Koontz .......................... 429/118

FOREIGN PATENT DOCUMENTS

| JP | 5-225978 A | 9/1993 |
| JP | 5-225979 A | 9/1993 |
| JP | 2010-159480 A | 7/2010 |
| JP | 2010-182435 A | 8/2010 |

* cited by examiner

*Primary Examiner* — Kenneth Douyette
*Assistant Examiner* — James Lee
(74) *Attorney, Agent, or Firm* — Lucas & Mercanti, LLP

(57) ABSTRACT

Disclosed is a magnesium metal-air battery in which capacity of a negative electrode made of magnesium or its alloy is sufficiently utilized for battery performance and which has a positive electrode material which is capable of coping with the capacity of the negative electrode. The magnesium metal-air battery includes at least one unit battery cell. The cell comprises a negative electrode made of magnesium or its alloy; a positive electrode-side catalyst layer including, as positive active material, activated carbon for absorbing oxygen in air, anhydrous poly-carboxylate, manganese and metal powder; a positive current collector which is made of conductive material and which is laminated on the positive electrode-side catalyst layer; and a separator which allows passing of ions between the negative electrode and the positive electrode-side catalyst layer while it separates therebetween. The positive electrode-side catalyst layer may further include carbon black, metal chloride and graphite. In use, where water or metal chloride solution is supplied to at least the positive electrode-side catalyst layer, an electromotive force is generated between the negative electrode and the positive current collector. In the case where a plurality of unit battery cells are connected in series, an insulator is provided therebetween.

18 Claims, 6 Drawing Sheets

MAGNESIUM METAL-AIR BATTERY

CROSS-REFERENCE TO RELATED APPLICATIONS

This application is a 371 of PCT/JP2012/069359, filed Jul. 30, 2012, which claims the benefit of JP patent application No. 2011-169177, filed Aug. 2, 2011, the contents of each of which are incorporated herein by reference.

TECHNICAL FIELD

The present invention relates to a magnesium metal-air battery which utilizes oxygen in the air and manganese dioxide as positive active material.

BACKGROUND OF TECHNICAL FIELD

Development of next generation cell or battery relating to the next generation vehicle and the introduction and spread of renewable energy is one of the recent attractive technologies which contribute to enhancement in the industrial competitiveness of Japan. In the fields of the next generation batteries, in addition to the efforts of further improvement of performance of lithium batteries which are presently used widely, research and development of new rechargeable cell or battery (secondary battery) or power generation cell or battery (primary battery) which takes the place of lithium batteries are now being conducted actively.

As the next generation battery which takes the place of lithium batteries, there are cells or batteries which use magnesium. Magnesium presents in the earth much larger than lithium as resources and it is superior in the view points of environmental safety.

Some technologies in relation to the batteries or cells in which magnesium or its alloy is used as negative active material are already disclosed or proposed in, for example, the following patent documents 1-3 or non-patent document 4.

The patent document 1 (Japanese Patent Kokai-Publication No. Hei 05-225978) discloses a magnesium manganese dioxide battery in which magnesium or its alloy is used as the negative active material, manganese dioxide is used as positive active material, and is used as positive active material, and magnesium perchlorate is used as primary electrolyte solution. The positive active material is so constituted that it involves activation chemical processed manganese dioxide primarily consisting of γ-crystal of barium in the amount of 0.4-6.0 weight percent.

The patent document 2 (Japanese Patent Kokai-Publication No. Hei 05-225979) also discloses a magnesium manganese dioxide battery in which magnesium or its alloy is used as the negative active material, manganese dioxide is used as positive active material, and magnesium perchlorate is used as primary electrolyte solution. In this battery, the positive active material is so constituted that it involves chemical synthesis manganese dioxide which comprises γ-crystal as main constituent, which is resulted from acid-process of manganese oxide, the manganese oxide being obtained by baking of manganese sulfate.

Further, the patent document 3 (Japanese Patent Kokai-Publication No. 2010-182435) discloses a magnesium battery which comprises a negative electrode formed of magnesium and a solution container adapted to keep therein electrolyte solution which allows elution of magnesium ion from the negative electrode. The solution container is constituted to keep therein poly-carboxylate (polyvalent carboxylate) solution as the aqueous electrolyte solution.

Furthermore, non-patent document 1 discloses an air magnesium battery which is so constituted that oxygen in the air is used as the positive active material, magnesium is used as the negative active material, and a solution of salt is used as the electrolyte solution.

PRIOR ART DOCUMENTS

Patent Documents

Patent document 1: Japanese Patent Kokai-Publication No. Hei 05-225978
Patent document 2: Japanese Patent Kokai-Publication No. Hei 05-225979
Patent document 3: Japanese Patent Kokai-Publication No. 2010-182435

Non-Patent Document

Non-patent document 1: URL search document entitled "Fabrication and Utilization of Air-Magnesium Battery" by Akiro Kobayashi, Toray Industries, Inc. search done on Dec. 17, 2008, Internet

SUMMARY OF THE INVENTION

Problems To Be Solved By the Invention

However, the magnesium manganese dioxide batteries disclosed in the above patent documents 1 and 2 have the technical defects or drawbacks in that, since the formation of passive state film on the surface of the negative electrode cannot be efficiently restricted, it is impossible or difficult to achieve sufficient discharge capacity. The passive-state film formed on the negative electrode is a barrier of cell performance.

Further, the magnesium battery disclosed in the patent document 3 has a drawback in that, although the capacity of the negative electrode formed of magnesium can be used well in cell performance, the positive electrode cannot efficiently or fully utilize the capacity of the negative electrode made of magnesium. The example disclosed therein is a half-cell in which sufficiently large electrode is used as the positive electrode with respect to a smaller negative electrode.

Still further, the air magnesium battery disclosed in the non-patent document 1 has a technical problem in that sufficient discharge capacity cannot be achieved as shown in FIG. 5 of the document.

The primary object of the present invention is, therefore, to obviate the above explained defects or drawbacks involved in the prior art techniques. Other object of the present invention is to provide a magnesium metal-air battery in which the capacity of negative electrode formed of magnesium, etc. is sufficiently utilized as cell performance, and in which positive electrode material corresponding in size to the capacity of the negative electrode formed of magnesium or its alloy is provided.

Means To Solve the Problems

According to one aspect of the present invention, there is provided a magnesium metal-air battery formed by at least one battery cell, said battery cell comprising:
a negative electrode formed of magnesium or its alloy;
a positive current collector which is made of conductive material and which is arranged to oppose to said negative electrode;

a positive electrode-side catalyst layer which is laminated on a surface of said positive current collector at a side of said negative electrode, said positive electrode-side catalyst layer including as positive active material at least activated carbon for absorbing oxygen in air, anhydrous poly-carboxylate, manganese and metal powder; and a separator arranged between said negative electrode and said positive electrode-side catalyst layer, said separator allowing passing of ions between said negative electrode and said positive electrode side catalyst layer but separating or insulating said negative electrode from said positive electrode-side catalyst layer;

wherein, in operation or use, where water or metalloid chloride solution is added to at least said positive electrode-side catalyst layer, an electromotive force is generated between said positive current collector and said negative electrode.

In the magnesium metal-air battery, said activated carbon is formed by such high-purity activated carbon powder as KURARAY COAL ® YP, YB or KURACTIVE ® CH, both commercially available from Kuraray Chemical Co., Ltd. in Japan.

In the magnesium metal-air battery, said poly-carboxylate is formed of at least one of citrate and succinate.

In the magnesium metal-air battery, said manganese includes natural manganese and/or electrolytic manganese.

In the magnesium metal-air battery, said metal powder is formed by copper powder or magnesium powder.

In the magnesium metal-air battery, said positive electrode side catalyst layer is a mixture of copper powder or magnesium powder in 5%-30% weight percent with respect to the weight of the activated carbon.

In the magnesium metal-air battery, said positive electrode-side catalyst layer comprises activated carbon and anhydrous poly-carboxylate in the ratio of 2:8-8:2 in weight.

In the magnesium metal-air battery, pH of said positive electrode-side catalyst layer is adjusted to 5-11, preferably 6-8.

In the magnesium metal-air battery, said negative electrode is formed by AZ31, AZ61 or AZ91.

In the magnesium metal-air battery, said positive electrode-side catalyst layer comprises carbon black, metalloid chloride and graphite in addition to said activated carbon, anhydrous poly-carboxylate, manganese and metal powder.

In the magnesium metal-air battery, said carbon black and graphite is mixed to the activated carbon in the weight ratio of 10%-50% of the activated carbon.

In the magnesium metal-air battery, in operation or use, the quantity of water or metalloid chloride solution added to the at least positive electrode-side catalyst layer is 1-2 ml per one layer (5 cm$^2$) of unit battery cell.

In the magnesium metal-air battery, said battery is constituted by a plurality of unit battery cells connected in series, the plurality of adjacent unit battery cells being separated by hydrophobic insulator material or member.

In the magnesium metal-air battery, said insulator material or member is a polyvinyl chloride (PVC) sheet or a polyethylene (PE) sheet.

According to the second aspect of the present invention, there is provided a magnesium metal-air battery formed by at least one battery cell, said battery cell comprising:

a negative electrode formed of magnesium or its alloy;

a U-shaped positive current collector which is made of conductive material and which is arranged to oppose to both sides of said negative electrode;

a positive electrode-side catalyst layer which is laminated on a surface of said positive current collector at a side facing to both the sides of said negative electrode, said positive electrode-side catalyst layer including, as positive active material, at least activated carbon for absorbing oxygen in air, anhydrous poly-carboxylate, manganese and metal powder; and a U-shaped separator arranged between said negative electrode and said positive electrode-side catalyst layer, said U-shaped separator allowing passing of ions between said negative electrode and said positive electrode-side catalyst layer but separating or insulating said negative electrode from said positive electrode-side catalyst layer;

wherein, in operation or use, where water or metalloid chloride solution is added to at least said positive electrode-side catalyst layer, an electromotive force is produced between said positive current collector and said negative electrode.

In the magnesium metal-air battery, said positive electrode-side catalyst layer comprises carbon black, metalloid chloride and graphite in addition to said activated carbon, anhydrous poly-carboxylate, manganese and metal powder.

In the magnesium metal-air battery, said battery is constituted by a plurality of unit battery cells connected in series, the plurality of adjacent unit battery cells being separated by hydrophobic insulator material or member.

In the magnesium metal-air battery, said insulator material is a polyvinyl chloride (PVC) sheet or a polyethylene (PE) sheet.

Effects Achieved By the Invention

The magnesium metal-air battery according to one aspect of this invention, in which the featured positive electrode-side catalyst layer is stacked or laminated on the positive current collector, makes it possible to achieve sufficient discharge capacity.

The magnesium metal-air battery according to the second aspect of this invention, in which the featured positive electrode-side catalyst layer is stacked on the positive current collector and in which the U-shaped separator and the U-shaped positive current collector surround the negative electrode in this order at its both sides, makes it possible to produce higher output current than that achieved by the above explained one.

PREFERRED EMBODIMENTS OF THE INVENTION

Embodiment 1

Figure 1:
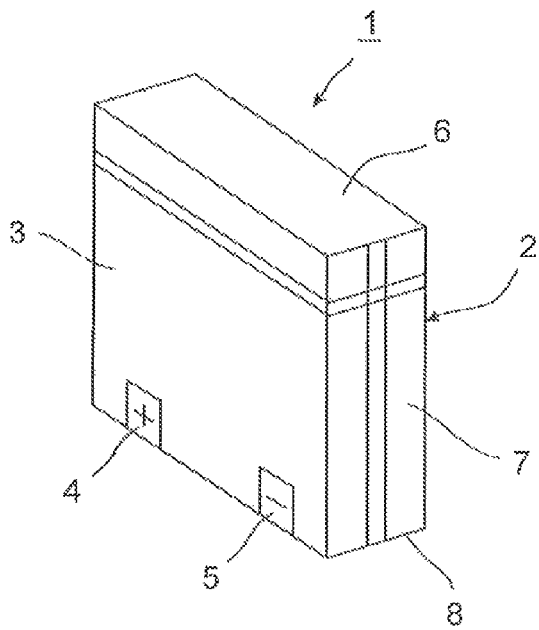
FIG. 1 is a diagrammatic perspective view showing a magnesium metal-air battery of the first embodiment according to the invention.

Now, some preferred embodiments of the present invention will be explained in detail with reference to the accompanying drawings. It should be noted that, throughout the drawings, the same or like reference numerals denote the same or like parts.

FIG. 1 a diagrammatic perspective view which shows a magnesium metal-air battery of the first embodiment of the present invention. As shown in FIG. 1, the magnesium metal-air battery 1 has a battery enclosure 2 of a rectangular parallelepiped shape. The thickness of the enclosure 2 is comparatively thin. It should be noted that the shape of the enclosure 2 is not limitative to the illustrated rectangular shape but may be any given shape depending on the necessity. The battery enclosure 2 has for example, at a lower portion of its one side-wall 3, a positive terminal 4 and a negative terminal 5. The position where the positive and negative terminals 4 and 5 are arranged is not limited to the illustrated lower portion of the side-wall 3. The terminals 4 and 5 may be arranged at an upper portion of the side-wall 3, an uppermost surface 6, a short side-wall 7 or a bottom surface 8 of the battery enclosure 2.

Figure 2:
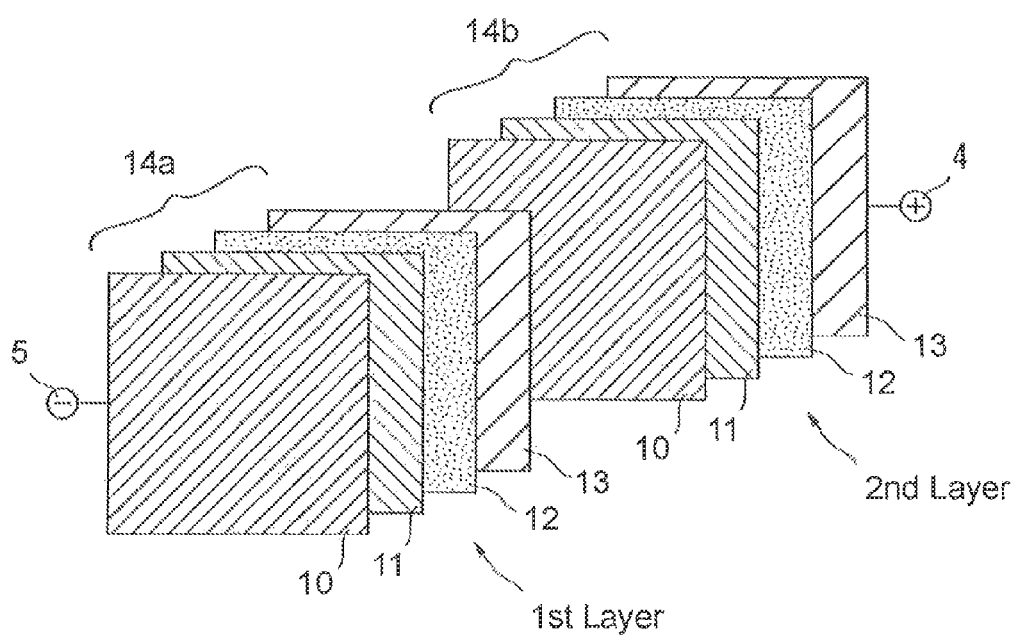
FIG. 2 is an exploded view of the magnesium metal-air battery of the first embodiment.
Figure 3:
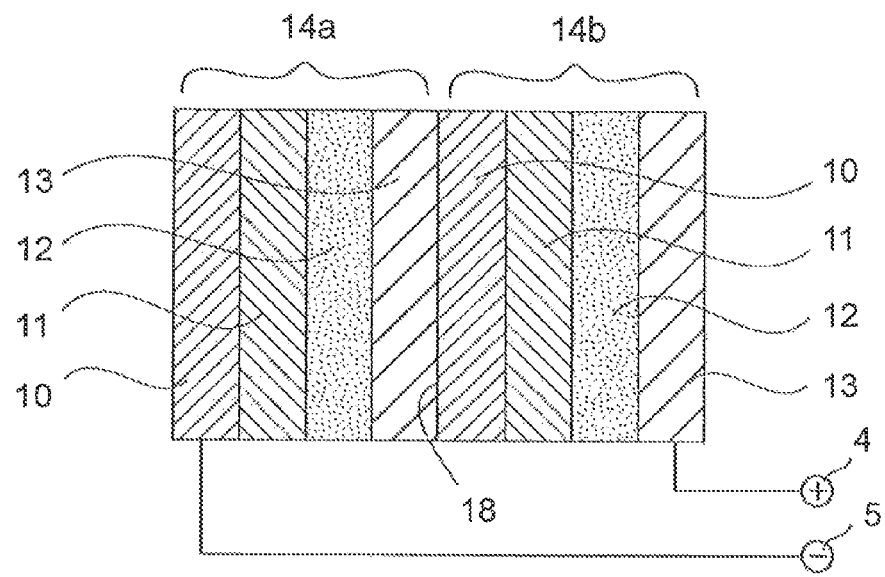
FIG. 3 is a sectional view of the magnesium metal-air battery of the first embodiment.

Inner space of the battery enclosure 2, there is arranged at least one stacked layer of the fundamental battery cell 14 (14a, 14b) as shown in FIG. 2 and FIG. 3. FIG. 2 is an exploded view showing the state in which a first layer of the battery cell 14a and a second layer of the battery cell 14b are arranged in series in a front and back direction. The number of stacking of the battery cells 14 is an arbitrary one which may be decided depending on the required voltages across the positive terminal 4 and the negative terminal 5.

The battery cell 14 is constituted by a negative electrode 10, a separator 11 as a separating means or member, a positive electrode-side catalyst layer 12 and a positive current collector 13 as a basic unit. In FIG. 2, the negative electrode 10 of the battery cell 14a of the first layer is connected to the negative terminal 5 by a wiring, while the positive current collector 13 of the battery cell 14b of the second layer is connected to the positive terminal 4 by another wiring. The positive current collector 13 of the first layer and the negative electrode 10 of the second layer are directly contacted with each other. The first wiring connecting the negative electrode 10 of the first layer to the negative terminal 5 and the second wiring connecting the positive current collector 13 of the second layer (final or end layer) to the positive terminal 4 may be unitarily constituted by the same materials which constitute the negative electrode 10 and the positive current collector 13, respectively.

As shown in FIG. 1, the illustrated shapes of the negative electrode 10, the separator 11, the positive electrode-side catalyst layer 12 and the positive current collector 13 are flat square. However, the shapes thereof are not limitative to such square shape. The shapes thereof may be flat disk shape. The shape of the battery enclosure 2 is decided based on the shapes of the negative electrode 10, the separator 11, the positive electrode-side catalyst layer 12 and the positive current collector 13.

The surface area of the negative electrode 10, the separator 11, the positive electrode-side catalyst layer 12 and the positive current collector 13, especially, the surface area of the negative electrode 10 directly depends on the output current which can be derived from the magnesium metal-air battery 1, Accordingly, the surface area of the negative electrode 10 and so on is determined according to the required output current, for example, about 5 mA to 1.5 A. On the other hand, since the number of stacked unit battery cells, each cell consisting of the negative electrode 10, the separator 11, the positive electrode-side catalyst layer 12 and the positive current collector 13 as a unit, determines the nominal output voltage of the magnesium metal-air battery 1, the stack number of the unit battery cells 14 is determined depending on the required output voltage of the magnesium metal-air battery 1.

Next, the parts or elements constituting the basic battery cell 14 is explained. First, the negative electrode 10 is formed of magnesium or magnesium alloy. Although the negative electrode 10 may be made of pure magnesium, it is preferable that the electrode 10 is made of magnesium alloy where the speed of battery performance is taken into consideration. Examples of the magnesium alloy are AZ31, AZ61 and AZ91 regulated under ASTM alloy are AZ31, AZ61 and AZ91 regulated under ASTM (American Society for Testing and Materials), each including magnesium, aluminum and zinc. Magnesium alloy AM60 or AM80 including magnesium and aluminum may well be used. Among the magnesium alloy including magnesium, aluminum and zinc, AZ61 whose aluminum content is greater than AZ31 (aluminum 3% and zinc 1%) is preferable. Still further, AZ91 having much more aluminum is further desirable in the point of prevention of self-discharging.

The magnesium or its alloy constituting the negative electrode 10 is configured to, for example, a flat square shape which has a predetermined length (width), height and thickness. The shape itself is not limitative to the square as already explained above. The electrode 10 may be configured to any given shape such as cylindrical or bar shape by the well-known die-casting process.

Magnesium constituting the negative electrode 10 is a quite suitable material for an electrode of the battery because magnesium gives a high standard electrode potential to the level of −2.37 V where magnesium ion is produced followed by $Mg \rightarrow Mg^{+2} + 2e^-$ under the presence of water or aqueous electrolyte solution of metal chloride, magnesium has high activity and magnesium has large capacity.

The separator 11 is disposed between the negative electrode 10 and the positive electrode-side catalyst layer 12. The separator 11 allows the passing of ions between the negative electrode 10 and the positive electrode-side catalyst layer 12 while it keep the separation therebetween. The separator 11 prevents the electric-shorting of the negative electrode 10 and the positive electrode-side catalyst layer 12. The separator 11 has characteristics of hydration and characteristics of keeping aqueous electrolyte solution whereby only ions are allowed to pass therethrough.

The separator 11 may well be constituted by well-known various materials as far as which satisfy the above explained requirements. The examples are polypropylene fiber, glass fiber and filter paper. The separator 11 is so constituted that it is supplied with water in the amount of 1 ml-2 ml per one layer in the case where the area of one battery unit 14 is 25 $cm^2$.

The positive electrode-side catalyst layer 12 is constituted by at least activated carbon for efficiently absorbing oxygen in the air, anhydrous poly-carboxylate, manganese and metal powder, as positive active material. The positive electrode-side catalyst layer 12 may comprise carbon black, metalloid chloride and graphite in addition to the above described activated carbon, anhydrous poly-carboxylate, manganese and metal powder. The catalyst layer 12 has a base material of sheet structure, e.g., non-fabric which is capable of taking into much greater oxygen in the air. The base material sheet 14 includes therein, as the positive active material, at least activated carbon for absorbing oxygen in the air, anhydrous poly-carboxylate, manganese and metal powder and, further, the positive electrode-side catalyst including carbon black, metalloid chloride and graphite may well be applied and fixed thereon depending on the case.

The activated carbon is not limitative and various materials well-known in the art can be used therefor. The activated carbon is used as an electric double-layer capacitor by utilization of its large surface area. The activated carbon is superior not only in discharging characteristics at large current but also in deterioration characteristics at discharging. Still further, the activated carbon is superior in the view points of safety and less environmental pollution. As commercially available activated carbon, high-purity activated carbon powder such as KURARAY COAL (Registered TM) YP, YB and KURACTIVE (also Registered TM) CH of Kuraray Chemical Co., Ltd. can be used.

It is desirable that the positive electrode-side catalyst layer 12 includes aqueous carboxylic acid having a plurality of carboxyl groups, for example, citric acid, succinic acid, malic acid and tartric acid. These carboxylic acids are preferably used as carboxylate wherein a part of or all of the protons are replaced by sodium Na or kalium K so that they give acidity in water and promote the self-discharging at the magnesium negative electrode. Furthermore, taking into consideration of the long-term safe keeping, it is desirable that the neutral carboxylate is anhydrous. More specifically, anhydrous trisodium citrate, anhydrous potassium sodium tartrate, or mixture thereof can be used.

Figure 9:
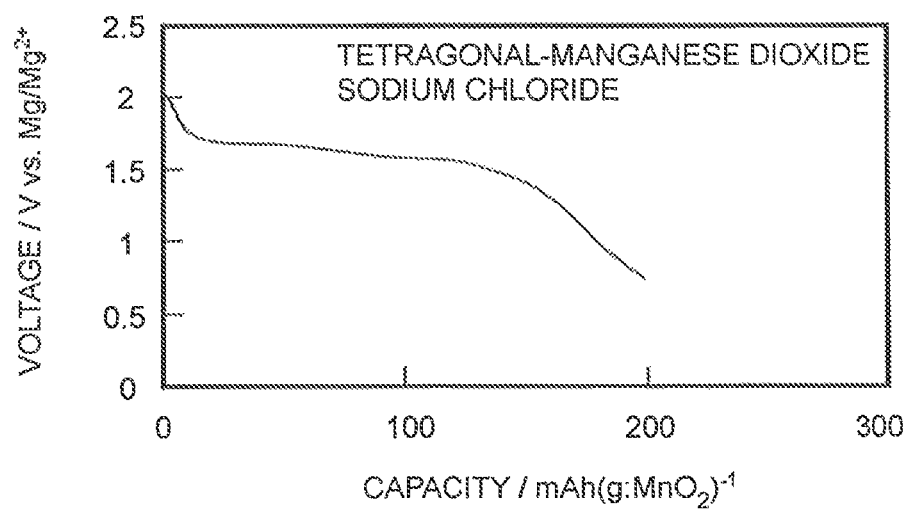
FIG. 9 is a graph showing the discharging characteristics where tetragonal-manganese dioxide and sodium chloride are used.
Figure 10:
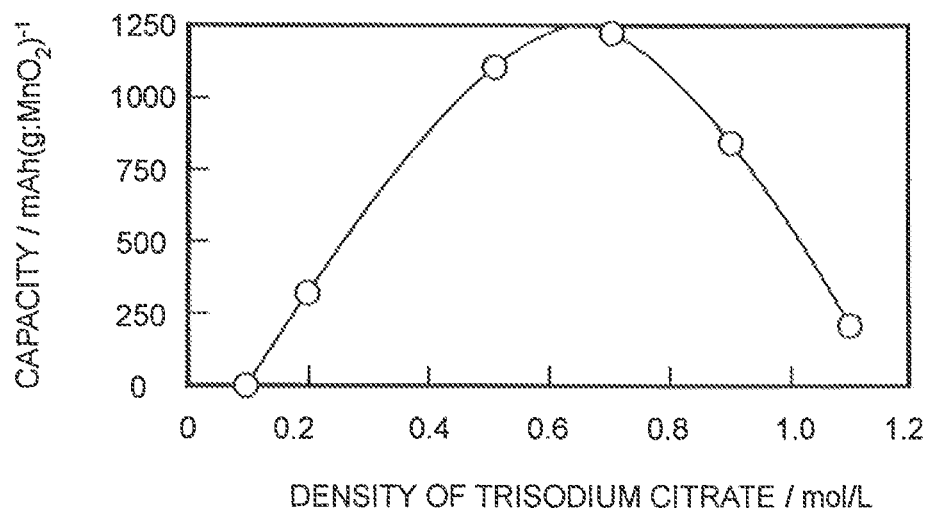
FIG. 10 is a graph showing the relationship between the density of trisodium citrate and the discharging capacity.

The positive electrode-side catalyst layer 12 is made by the following steps. First, activated carbon and anhydrous poly-carboxylate are mixed at the predetermined weight ratio. Although it depends on the kinds of poly-carboxylate to be used, the required result can be attained at the weight ratio between 2:8 and 8:2 of the activated carbon and poly-carboxylate. As an example, where anhydrous trisodium citrate is used, the preferable ratio is 5:5 to 7:3 in weight. FIG. 9 shows a relationship of density of the trisodium citrate vs. discharging capacity. Next, such metal powder as copper powder (Cu) or magnesium powder (Mg) (in the order of 5% weight to the activated carbon) are added to the activated carbon and, then, the resultant mixture is stirred in the mixing vessel by the mixer in the predetermined period of time under the room temperature, whereby copper oxide whose color is black changed from reddish brown of the added copper powder by oxidation is produced. In the course of mixing, water of an appropriate amount is sprayed in the mixing vessel.

Thereafter, to the above resultant mixture, natural manganese is mixed in the weight ratio of 10%-50% with respect to the above explained activated carbon and, carbon black, Ketjenblack (Registered TM) and graphite are mixed in the weight ratio of 10%-50% with respect to the above explained activated carbon. Depending on the necessity, aluminum powder is mixed thereto in the weight ratio of about 1% with respect to the activated carbon. The positive electrode-side catalyst is produced by mixing these materials in the mixing vessel in the predetermined period of time under a normal room temperature.

The natural manganese includes, for example, pyrolusite ($MnO_2$), hausmannite ($Mn_3O_4$) rhodochrosite ($MnCO_3$) and braunite ($3Mn_2O_3.MnSi_3$).

Figure 8:
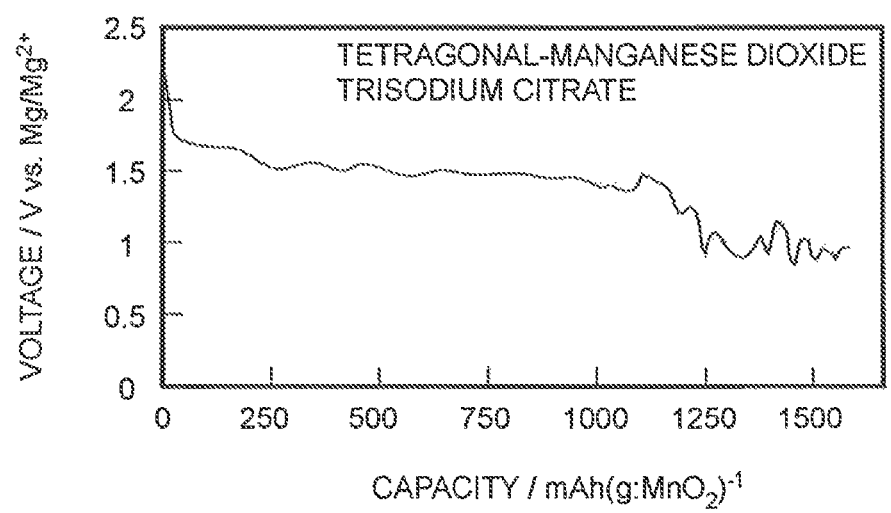
FIG. 8 is a graph showing the discharging characteristics where tetragonal-manganese dioxide and trisodium citrate are used.

The natural manganese gives an effect of enhancement of durability or lifetime of the magnesium metal-air battery as shown in FIG. 8.

Thereafter, in order to adjust the pH of the positive electrode-side catalyst produced as above, such as sodium hydroxide, potassium hydroxide, and calcium hydroxide is added thereto so that the pH of the positive electrode-side catalyst becomes 5-12. If the pH of the positive electrode-side catalyst is low, in the order of 2-2.5, it is not desirable because of generation of hydrogen. On the other hand, if the pH thereof is high, in the order of 12, it is not desirable because of generation of hydroxide of magnesium.

The above positive electrode-side catalyst 15 is applied on and fixed on such a sheet substrate as the carbon sheet by bonding agents whereby the positive electrode-side catalyst layer 12 is produced. As the boding agent, the well-known various materials, for example, SBR (styrene butadiene rubber) can be used.

The sheet substrate of the above positive electrode-side catalyst layer 12 is tightly adhered on the separator 11, It is desirable that the substrate is porous. The sheet substrate constitutes oxygen absorbing means for absorbing oxygen as the positive active material. The oxygen absorbing means is constituted by not only such oxygen absorbing material as activated carbon but also, at least, anhydrous poly-carboxylate, manganese and metal powder.

The oxygen absorbing means absorbs oxygen in the air as the positive electrode and generates hydroxide ions in the positive electrode-side catalyst layer 13 by deoxidization as follows:

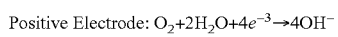

Positive Electrode: $O_2 + 2H_2O + 4e^{-3} \rightarrow 4OH^-$

The positive current collector 13 made of conductive material is tightly fixed on the positive electrode-side catalyst layer 12, and supplies generated ions to the positive electrode-side catalyst layer 12. The material constituting the positive current collector 13 is not limitative as far as it is conductive. The positive current collector 13 may be constituted by such metal plate having high conductivity as a copper plate or a carbon sheet.

The magnesium metal-air battery having the above-explained construction of this embodiment makes it possible to efficiently utilize the capacity of the negative electrode made of magnesium as battery performances. It also makes it possible to provide a magnesium metal-air battery having the material of the positive electrode which is capable of coping with the capacity of the negative electrode made of magnesium or its alloy.

In actual operation of the magnesium metal-air battery having the above-explained structure, water of an appropriate amount is supplied to at least the positive electrode-side catalyst layer 12 or simultaneously to the positive electrode-side catalyst layer 12 and the separator 11 of the battery cell 14 in the battery enclosure 2. Supplying of the appropriate amount of water is performed by pressing a button of a soft resin pack arranged at the inner upper portion of the battery enclosure 2. The resin pack houses therein water in advance. The water in the resin pack is supplied to at least the positive electrode-side catalyst layer 12 through a hole opened by a needle connected to the button pressed by an operator. It should be noted that supplying of water of the appropriate amount to the battery cell 14 is not limited to the above explained manner. Supplying of water may well be achieved by directly pouring into the battery cell through an opening (not shown) arranged at the uppermost surface of the battery cell 2.

In the magnesium metal-air battery 1, where water of the appropriate amount is supplied to the battery cell 14 in the battery enclosure 2, especially to the positive electrode-side catalyst layer 12, poly-carboxylic ion is generated by hydrolysis of anhydrous poly-carboxylate involved in the positive electrode-side catalyst layer 12.

In the magnesium metal-air battery 1, where water is supplied to at least the positive electrode-side catalyst layer 12 or supplied to both the positive electrode-side catalyst layer 12 and the separator 11, magnesium ion is generated by ionization of magnesium in the negative electrode 10 which is in contact with the separator 11 ($2Mg \rightarrow 2Mg^{+2} 4e^-$). Simultaneously generated electron ($4e^-$) moves toward the negative electrode 10.

Chelate bonding of ion of poly-carboxylate to the eluted magnesium ion restricts or prevents magnesium ion from combining with the hydroxide ion so that elution degree of magnesium ion is greatly enhanced and the production of passive state film made of magnesium hydroxide on the surfaces of the negative electrode 10 and the positive current collector 13 is restricted. Furthermore, buffer action of poly-carboxylic ion prevents the aqueous electrolyte from easily changing to alkalinity.

On the other hand, in the positive electrode-side catalyst layer 12, oxygen in the air is absorbed by the activated carbon, and there occurs following reduction by manganese dioxide in the positive electrode-side catalyst layer 12:

$$2MnO_2 + H_2O \rightarrow Mn_2O_3 + 2OH^-$$

It is thought that the copper powder in the positive electrode-side catalyst layer 12 is changed to copper oxide represented by $Cu_4O_3$, $Cu_2O$, CuO by the its partial oxidation. It is well know in the art that copper oxide functions as catalyst for oxidation and reduction where hydrogen is involved.

At the positive electrode-side catalyst layer 12, it is thought that the following reaction occur entirely.

$$4H^+ + O_2 + 4e^- \rightarrow 2H_2O$$

(oxygen consumption reaction at acid region)

$$2H^+ + 2e^- \rightarrow H_2$$

(hydrogen generation reaction at acid region)

$$2H_2O + O_2 + 4e^- \rightarrow 4OH^-$$

(oxygen consumption reaction at alkali region)

$$2H_2O + 2e^- \rightarrow H_2 + 2OH^-$$

(hydrogen generation reaction at alkali region)

In the above, the electrons generated at the negative electrode are consumed by electro chemical reaction. Reaction occurrence ratio at the respective electrodes depends on the pH value around the positive electrode and the electric potential of the positive electrode.

The inventor of this invention manufactured on trial the magnesium metal-air battery as shown in FIGS. 1-3 and measured the characteristics of the voltage and the discharging capacity thereof.

[Fabrication of the Positive Electrode Side Catalyst Layer]

Activated carbon and trisodium citrate as anhydrous poly-carboxylate are mixed in the mixing vessel in the weight ratio of 6:4, and copper powder in the amount of 5% weight with respect to the total weight of the activated carbon is added the above mixture with a sufficient period of time, whereby the positive electrode-side catalyst A is produced. Then, natural manganese and electrolytic manganese in the amount of 50% weight with respect to the total weight of the activated carbon is mixed to the above catalyst A and, further, carbon black in the amount of 20% weight with respect to the total weight of the activated carbon is mixed thereto with a sufficient period of time, whereby the positive electrode-side catalyst B is produced. Finally, calcium hydroxide is mixed to the positive electrode-side catalyst B so that the pH value of the catalyst becomes in the range of 5-8. Final positive electrode-side catalyst is thus produced.

The resultant positive electrode-side catalyst produced by the above-explained steps is applied on and fixed on a carbon paper constituting a substrate member with appropriate bodying agent used, whereby the positive electrode-side catalyst layer 12 is fabricated.

[Fabrication of the Negative Electrode]

Plate of magnesium alloy (AZ31) is used as the negative electrode 10.

[Fabrication of the Positive Electrode]

Copper plate is used as the positive current collector 13.

[Adjustment of the Separator]

Water of 15 ml is supplied to the separator 11 at the time when the magnesium metal-air battery 1 is to be in operation or use.

[Comparative Battery]

The comparative battery uses sodium chloride in place of trisodium citrate of the battery of this invention, as catalyst which is added to the positive electrode-side catalyst layer. With the same manner as in the first embodiment 1, the characteristics of the voltage of the negative electrode and the discharging capacity are measured, FIG. 9 is a graph where sodium chloride is added as catalyst.

Figure 11:
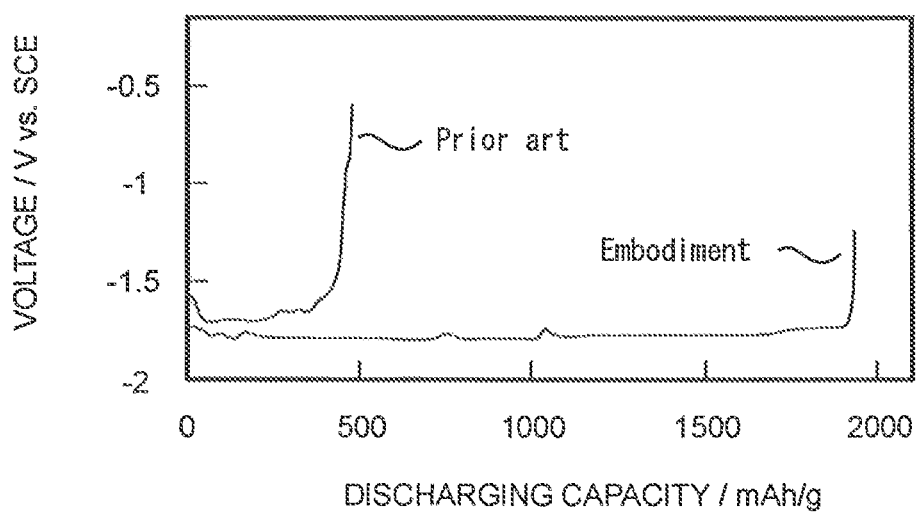
FIG. 11 is a graph showing the discharging characteristics between the magnesium metal-air battery according to the invention and the prior art comparative one.

FIG. 11 is a graph showing the difference of the discharging characteristics between the embodiment 1 of the invention and the prior art.

As clearly understood from FIG. 11, the embodiment 1 according to the present invention achieves the discharging capacity of 1832 mAh/g (maximum 1920 mAh/g) which is approximately 80% of the theoretical value of 2290 mAh where magnesium is used as the negative electrode.

In contrast to the above, the discharging capacity of the comparative prior art one is less than 500 mAh/g, As explained hereinabove, according to the embodiment 1, the capacity of the negative electrode made of magnesium or its alloy is efficiently utilized to the battery performance. Further, magnesium metal-air battery having a positive electrode material which is capable of coping with the capacity of the negative electrode made of magnesium or its alloy can be provided.

The inventor made an experimentation to prove that oxygen in the air sufficiently reacts in the positive electrode-side catalyst layer to reflect on the battery performance and the formulas described above are correct, under the condition that copper foil and copper mesh are used as the current collector. The experimentation reveals that the lifetime of the battery at the output voltage of 1.1 V is enhanced from 42 hours to 54 hours and that the oxygen in the air sufficiently reacts to the catalyst layer.

Figure 4:
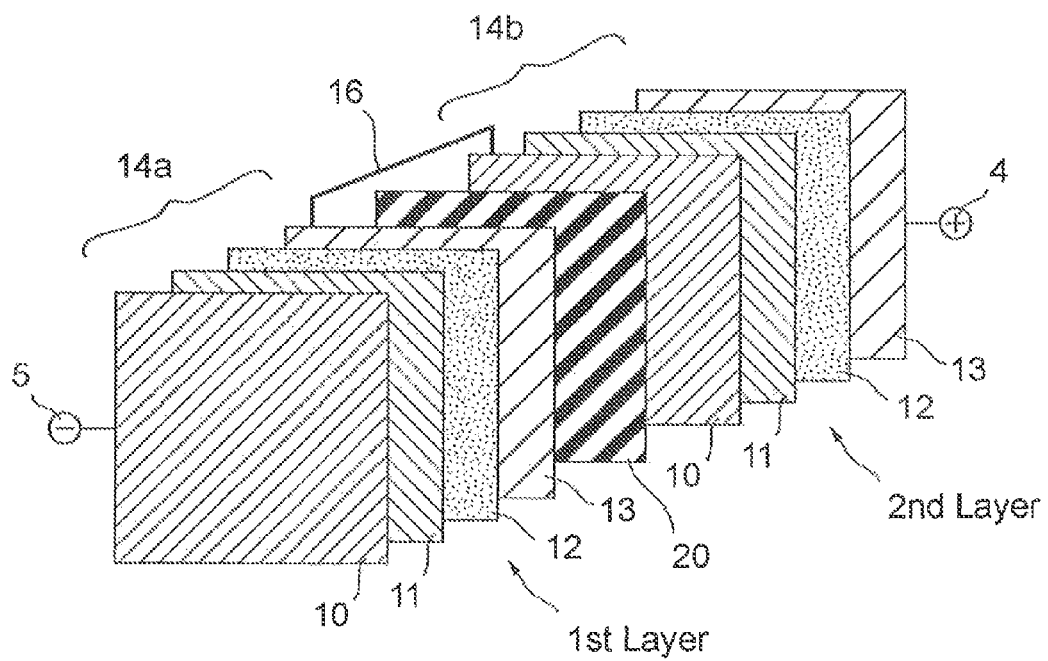
FIG. 4 is an exploded view of the magnesium metal-air battery of the first embodiment, wherein a plurality of unit battery cells are connected in series with insulators being arranged between the adjacent battery cells.

FIG. 4 shows a modified magnesium metal-air battery of the one shown in FIGS. 1-3. In the magnesium metal-air battery shown in FIGS. 1-3 wherein a plurality of fundamental battery cells 14 are connected in series, as clearly shown in FIG. 3, the positive current collector 13 of the battery cell 14a of the first layer directly contacts the negative electrode 10 of the battery cell 14b of the second layer at a contact surface 18. Since the positive current collector 13 is formed by, for example, a copper plate while the negative electrode 10 is made of magnesium or its alloy, if water or electrolyte solution invades or presents between these metals of different kinds, there occurs a potential difference therebetween. Local battery or galvanic battery thus occurred causes the local current corrosion or galvanic corrosion.

FIG. 4 shows a magnesium metal-air battery which is so constructed that such galvanic corrosion is prevented from occurring. More specifically, between the positive current collector 13 of the unit battery cell 14a of the first layer and the negative electrode 10 of the unit battery cell 14b of the second layer, there is provided an insulating material or member 20 with hydrophobic characteristics so that the positive current collector 13 does not directly contact the negative electrode 10. Examples of hydrophobic insulating material are a polyvinyl chloride (PVC) sheet or a polyethylene (PE) sheet. In this embodiment, the electrical connection in series between the adjacent unit battery cells 14a and 14b is achieved by connecting the positive current collector 13 of the first layer to the negative electrode 10 of the second layer by means of an internal wiring 16. It is needless to say that the achieved electrical characteristics of this modified embodiment are the same as those shown in FIGS. 2 and 3. With this modified embodiment, galvanic corrosion caused by local battery and deterioration of discharging capacity can be effectively obviated.

Embodiment 2

Now, magnesium metal-air battery of the second embodiment 2 according to the invention will be explained with reference the accompanying drawings. The parts or elements constituting the battery of this embodiment 2, corresponding to the same or like parts or elements of the battery of the above explained first embodiment are denoted with same reference numerals of the first embodiment. Here, no further explanation is made for such same parts or elements. The feature of this embodiment is that, as clearly illustrated in FIG. 5 of a diagrammatic exploded view and FIG. 6 of a sectional view, two sets of separators 11, positive electrode-side catalyst layers 12 and current collectors 13 are symmetrically arranged at both sides with the common negative electrode 10 being positioned as a center. The positive current collector 13 which is arranged at the outermost position is folded into a U-shape and two inner walls oppose to both the sides of the negative electrode 10. Inner spaces of the U-shaped positive current collector 13, there is provided a separating means (separator) 11 which is also folded into U-shape so as to surround the negative electrode 10. Between the separator 11 and the positive current collector 13, there are arranged the positive electrode-side catalyst layers 12, respectively.

With this embodiment 2 wherein two sets of the separators 11, the positive electrode-side catalyst layers 12 and the positive current collectors 13 are arranged at both the sides of the common negative electrode 10, the current capacity which is derived from one battery cell 14 becomes about double that available from the magnesium metal-air battery of the above-explained first embodiment 1.

Figure 5:
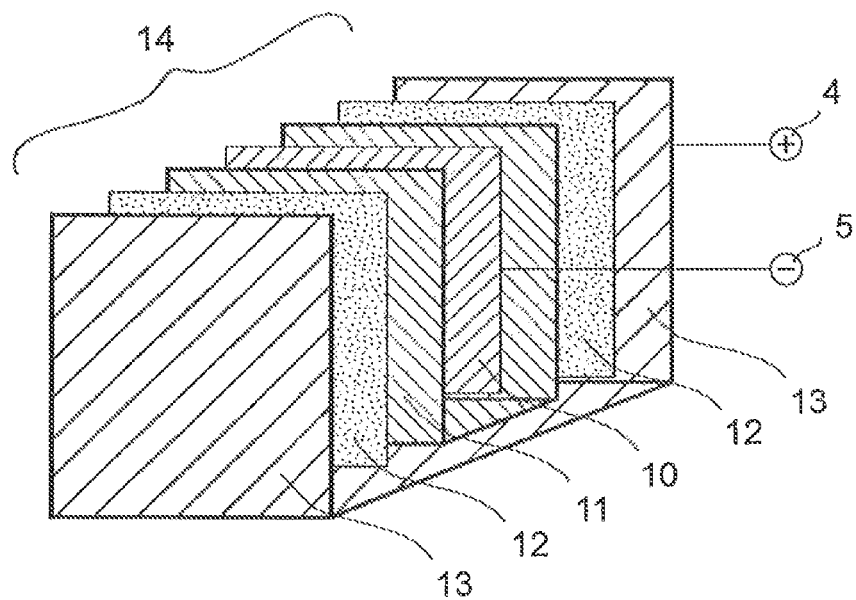
FIG. 5 is an exploded view of the magnesium metal-air battery of the second embodiment according to the invention.
Figure 6:
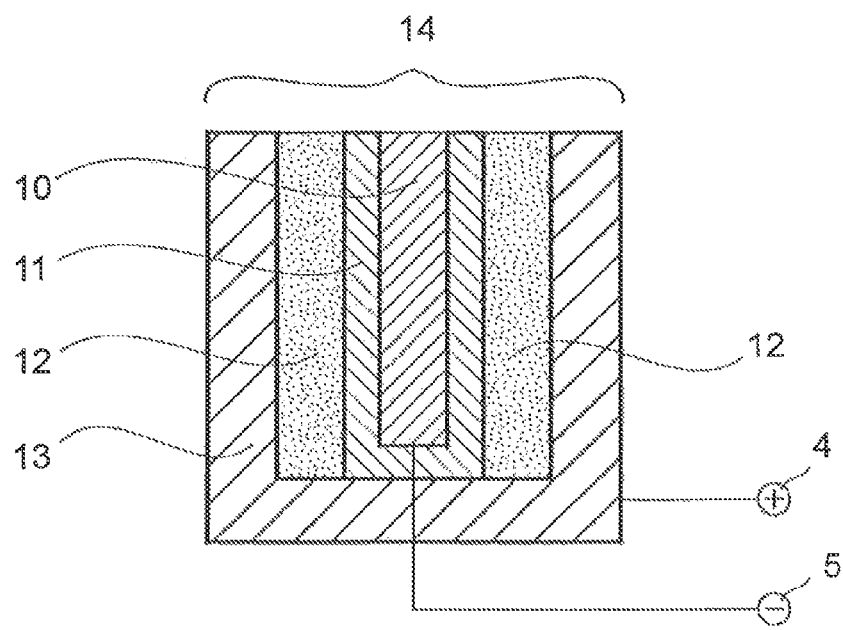
FIG. 6 is a sectional view of the magnesium metal-air battery of the second embodiment.
Figure 7:
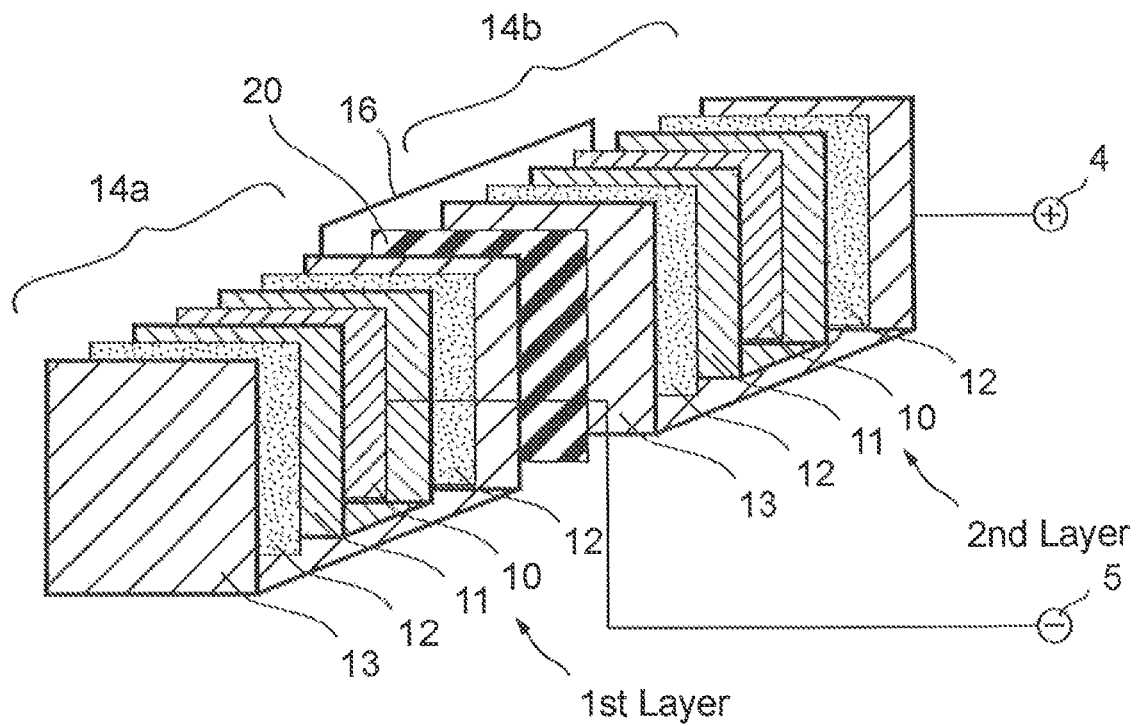
FIG. 7 is an exploded view of the magnesium metal-air battery of the second embodiment, wherein a plurality of unit battery cells are connected in series with insulators being arranged between the adjacent battery cells.

FIG. 7 diagrammatically shows a magnesium metal-air battery in which two unit battery cell 14 of the second embodiment shown in FIGS. 5 and 6 are connected in series. In this embodiment 2, since the positive current collector 13 of the first battery cell 14a of the front-side first layer and that of the second battery cell 14b of the rear-side second layer are located side by side and the material is the metal of the same kind, no local battery or galvanic batter occurs therebetween. If two unit battery cells 14a and 14b are connected in parallel, the hydrophobic insulator 20 therebetween can be dispensed with. However, two battery cells 14a and 14b are connected in series, the hydrophobic insulator is absolutely necessary therebetween. The hydrophobic insulator 20 is formed by, for example, a polyvinyl chloride (PVC) sheet or a polyethylene (PE) sheet.

The positive current collector 13 of the unit battery cell 14a of the front-side first layer is connected by an internal wiring 16 to the negative electrode 10 of the unit battery cell 14b of the rear-side second layer. The electromotive force generated between the negative electrode 10 of the unit battery cell 14a of the front-side first layer and the positive current collector 13 of the unit battery cell 14b of the rear-side second layer is led to the negative terminal 5 and the positive terminal 4. The battery output can be derived across these terminals 4 and 5. The magnesium metal-air battery of this second embodiment 2 allows current capacity about double the current capacity of the above-explained first embodiment.

As above, although preferred embodiments of the magnesium metal-air battery of the invention have been explained in detail with reference to the accompanying drawings, the invention is not limited to the above explained and illustrated embodiments and the invention covers any further modification or changes without departing from the spirit of the invention.

INDUSTRIAL APPLICABILITY

The invention can be effectively used for developing the next generation battery which provides renewable energy and which is superior in safety.

What is claimed is:

1. A magnesium metal-air battery formed by at least one battery cell, said battery cell comprising:
   a negative electrode formed of magnesium or its alloy;
   a positive current collector which is made of conductive material and which is arranged to oppose to said negative electrode;
   a positive electrode-side catalyst layer which is laminated on a surface of said positive current collector at a side of said negative electrode, said positive electrode-side catalyst layer including, as positive active material, at least activated carbon for absorbing oxygen in air, anhydrous poly-carboxylate, manganese and metal powder; and
   a separator arranged between said negative electrode and said positive electrode-side catalyst layer, said separator allowing passing of ions between said negative electrode and said positive electrode-side catalyst layer but separating or insulating said negative electrode from said positive electrode-side catalyst layer;
   wherein, in operation or use, where water or metalloid chloride solution is added to at least said positive electrode-side catalyst layer, an electromotive force is generated between said positive current collector and said negative electrode.

2. A magnesium metal-air battery according to claim 1, in which said activated carbon is formed by such high-purity activated carbon powder.

3. A magnesium metal-air battery according to claim 1, in which said poly-carboxylate is formed of at least one of citrate and succinate.

4. A magnesium metal-air battery according to claim 1, in which said manganese includes natural manganese and/or electrolytic manganese.

5. A magnesium metal-air battery according to claim 1, in which said metal powder is formed by copper powder or magnesium powder.

6. A magnesium metal-air battery according to claim 1, in which said positive electrode-side catalyst layer is a mixture of copper powder or magnesium powder in 5%-30% weight percent with respect to the weight of the activated carbon.

7. A magnesium metal-air battery according to claim 1, in which said positive electrode-side catalyst layer comprises activated carbon and anhydrous poly-carboxylate in the ratio of 2:8-8:2 in weight.

8. A magnesium metal-air battery according to claim 1, in which said positive electrode-side catalyst layer is adjusted to have ph of 5-11, preferably 6-8.

9. A magnesium metal-air battery according to claim 1, in which said negative electrode is formed by AZ31, AZ61or AZ91.

10. A magnesium metal-air battery according to claim 1, in which said positive electrode-side catalyst layer further comprises carbon black, metalloid chloride and graphite in addition to said activated carbon, anhydrous poly-carboxylate, manganese and metal powder.

11. A magnesium metal-air battery according to claim 10, in which said carbon black and graphite is mixed to the activated carbon in the weight ratio of 10%-50% of the activated carbon.

12. A magnesium metal-air battery according to claim 1, in which said at least positive electrode-side catalyst layer is supplied with water or metalloid chloride solution in the amount of 1-2 ml per one layer (5 cm$^2$) of said unit battery cell in operation or use.

13. A magnesium metal-air battery according to claim 1, in which said battery is constituted by a plurality of said unit battery cells connected in series, said plurality of adjacent unit battery cells being separated by hydrophobic insulator material or member.

14. A magnesium metal-air battery according to claim 13, in which said insulator material or member is a polyvinyl chloride (PVC) sheet or a polyethylene (PE) sheet.

15. A magnesium metal-air battery formed by at least one battery cell, said battery cell comprising:

a negative electrode formed of magnesium or its alloy;

a U-shaped positive current collector which is made of conductive material and which is arranged to oppose to both sides of said negative electrode;

a positive electrode-side catalyst layer which is laminated on a surface of said positive current collector at a side facing to both the sides of said negative electrode, said positive electrode-side catalyst layer including, as positive active material, at least activated carbon for absorbing oxygen in air, anhydrous poly-carboxylate, manganese and metal powder; and a U-shaped separator arranged between said negative electrode and said positive electrode side catalyst layer, said U-shaped separator allowing passing of ions between said negative electrode and said positive electrode-side catalyst layer but separating or insulating said negative electrode from said positive electrode side catalyst layer;

wherein, in operation or use, where water or metalloid chloride solution is added to at least said positive electrode-side catalyst layer, an electromotive force is produced between said positive current collector and said negative electrode.

16. A magnesium metal-air battery according to claim 15, in which said positive electrode-side catalyst layer further comprises carbon black, metalloid chloride and graphite in addition to said activated carbon, anhydrous poly-carboxylate, manganese and metal powder.

17. A magnesium metal-air battery according to claim 15, in which said battery is constituted by a plurality of said unit battery cells connected in series, said plurality of adjacent unit battery cells being separated by hydrophobic insulator material or member.

18. A magnesium metal-air battery according to claim 17, in which said insulator material is a polyvinyl chloride (PVC) sheet or a polyethylene (PE) sheet.

* * * * *